2,612,000

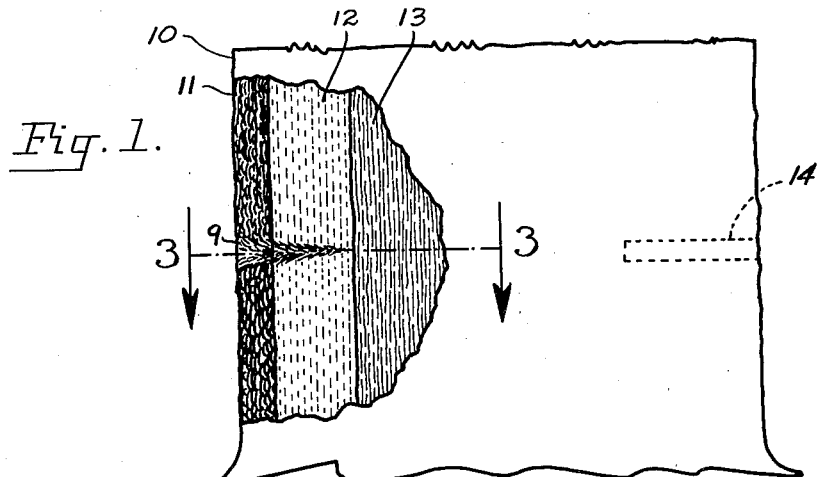
Fig. 1.
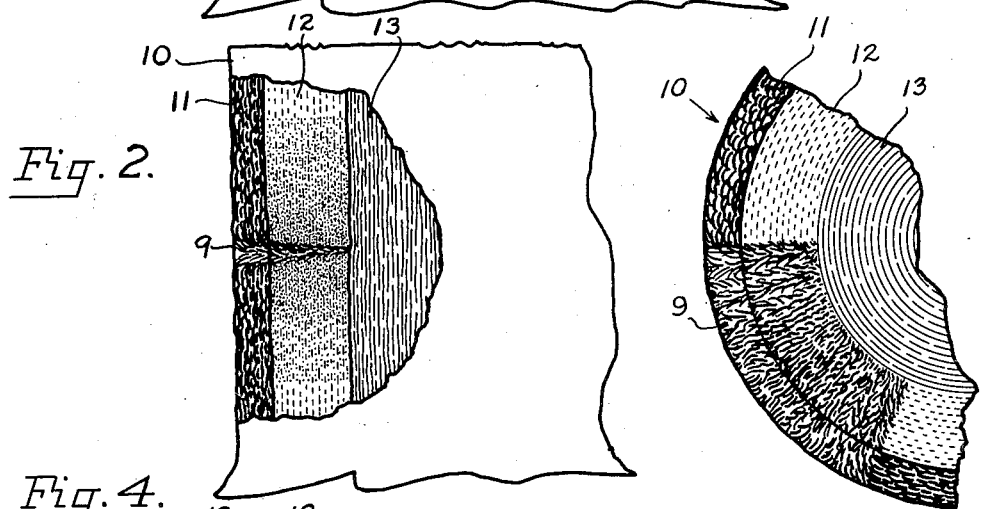
Fig. 2.
Fig. 3.
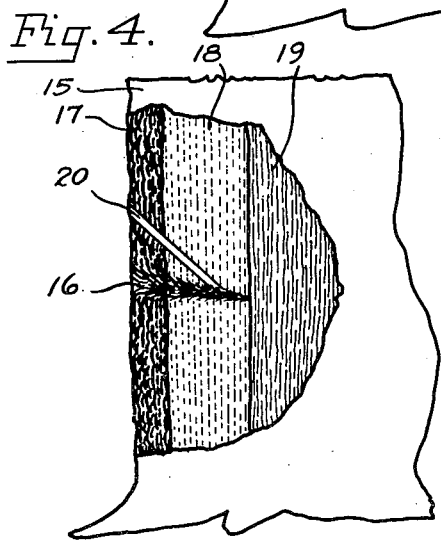
Fig. 4.
INVENTOR.
Arthur B. Anderson Patented Sept. 30, 1952

UNITED STATES PATENT OFFICE 2,612,000

PRODUCING EXTRACTIVE MATERIALS FROM LIVING TREES

Arthur B. Anderson, Portland, Oreg.

Application August 24, 1949, Serial No. 112,082

13 Claims. (Cl. 47—10)

This invention relates to a method for treating living trees by means of which the trees may be made to deposit within their sapwood structures an amount of extractive materials which is many times in excess of that produced by their normal physiological processes. The invention relates further to a method of recovering the extractive materials deposited in this manner in the sapwood of the trees.

The present application is a continuation-in-part of my co-pending application (now abandoned) Serial Number 677,925, filed June 19, 1946, for Process for Increasing Yield of Extractives in Living Trees and Recovery Thereof.

As used in the above patent application, and as used herein, the terms "extractives" and "extractive materials" denote those components of the tree which may be separated by extraction of the wood with neutral organic solvents. Hence they refer particularly to rosin (resin acids), turpentine, pine oil, fats, fatty acids, sterols, tannins, cycloses, carbohydrates and similar materials. They do not refer to the integral components of the wood, i. e. the cellulose, lignin, and hemicellulose.

In the processes of the prior art relating to the production of such extractives as rosin and turpentine or oleoresin from southern pines, first an area of the bark near the ground on one side of the tree is shaved off, after which a shallow cut is made a few inches above the ground and an apron or gutter is inserted. A cup is placed below the gutter to collect the oleoresin drippings. A shallow streak or open wound, about ½ inch deep into the sapwood, is placed above the gutter with a heavy short instrument called a "hack."

Oleoresin soon appears in droplets on the surface of the streak, and as more of the yellowish white gum collects, it flows slowly over the gutter or apron and into the cup. It is customary to repeat this wounding process weekly by chipping a new ½ inch wide streak, to insure continued flow of oleoresin. If this scarifying is not repeated periodically, the wound soon ceases to produce additional oleoresin. After repeated scarifying, the open face may become several feet in height. The amount of extractives or resin beyond the scarified surface is usually normal in amount and the lumber manufactured from such a tree likewise is not affected. This process is more fully described by Gerry, "Oleoresin Production," U. S. Dept. Agriculture, Tech. Bull. No. 262, U. S. Government Printing Office, Washington, 1931.

It also is known that the turpentine wound can be made to produce oleoresin flow over a longer period of time, without rescarifying so frequently, by spraying the open wound with chemicals, such as mineral acids or alkalies. Consequently, about the same total yield of oleoresin per season can be obtained from acid-treated streaks made at two-week intervals as from untreated streaks made at weekly intervals. Neither the oleoresin nor the wood beyond the acid treated scarified surface is affected. This process is more fully disclosed by Everard, "Modern Turpentining Practices," U. S. Dept. of Agriculture, Farmer's Bulletin No. 1984, U. S. Government Printing Office, Washington, 1947.

Another method used in obtaining extractives such as wood rosin, pine oil, and turpentine from southern pines is the solvent extraction of southern pine stumps and light wood. It is the practice of the wood rosin processing industries to allow the stump to remain in the ground 8 to 10 years to permit the bark and the sapwood, which contains little extract, to slough off, thus leaving the heartwood in which the extractives are more highly concentrated. (Humphrey, Ind. Eng. Chem. 35, 1063, 1943.) The seasoned pine stump heartwood which remains contains from 22% to 30% by weight extractives. It is then processed for the recovery of its extractive content by suitable methods such as, for example, removing the stump from the ground, reducing it to chips or small pieces, and extracting the chips with a suitable solvent for the separation of the extractives from the wood.

However, in actual application, the foregoing process has numerous disadvantages principal among which are the fact that the maximum yield of extractives is not realized until the stump has been permitted to remain in the ground for from 8 to 10 years, and the fact that the stumps from immature trees contain essentially sapwood which does not contain a sufficient amount of extractive materials to warrant their processing. For these reasons, the recovery of extractives from southern pine stumps is a very selective process, time consuming, and limited in its application.

It therefore is a primary object of the present invention to provide a method whereby extractive materials may be deposited in large amounts in selected areas of living trees.

It is another object of my invention to provide a method whereby extractive materials may be deposited continuously over long periods of time in selected areas of living trees.

Still a further object of my invention is the provision of a method whereby living trees may be caused to deposit extractive materials in selected areas continuously over a long period of time without attention or effort beyond the initial treatment of the tree.

Another important object of my invention is the provision of a method for treating living trees whereby to cause them to deposit in selected areas extractive materials having a proportion of valuable constituents substantially greater than that normally found in the extractives produced by the same trees.

It is another object of my invention to provide a method for greatly increasing the extractive content of the sapwood portion of the stumps of trees so that the entire stump including both the sapwood and the heartwood portions may profitably be processed for the recovery of extractive materials.

It is another object of my invention to provide a method for utilizing cull trees of little value as lumber as commercial sources of extractive materials.

Still another object of my invention is the provision of a method for greatly increasing the extractive content of immature trees composed almost entirely of sapwood in order that such trees may be utilized profitably as commercial sources of extractive materials.

The manner in which the foregoing and other objects of the present invention are accomplished will be apparent from the following specification and claims considered together with the accompanying drawings wherein:

Figure 1 is a view in elevation partly in section of a tree which has just been treated by the presently described method, prior to the extensive deposit of extractive materials;

Figure 2 is a view similar to that of Figure 1, but showing the tree after a period of time has elapsed and after extractive materials have accumulated about the wound;

Figure 3 is a sectional view along the line 3—3 of Figure 1; and

Figure 4 is a view in elevation, partly in section, of a tree which has been treated by a modification of the method of my invention.

Broadly stated, the method of my invention for stimulating the production of extractive materials by living trees and for causing the continuing deposit of such materials in selected areas of the trees comprises first inflicting a substantially closed wound in the sapwood of the tree, the wound penetrating the sapwood substantially to the heartwood region, and then permitting the continuous accumulation of the extractive materials throughout the woody structure of the tree in the region of the wound. When the tree is treated in this manner, the extractive materials seal the wound protecting it from the atmospheric environment, and accumulate in the sapwood above and below the wound in high concentration. The deposit of extractive materials is continuous without further treatment of the tree so that ultimately a concentration of extractives many times that, i. e. from 20 to 40 times that, normally found in this region of the tree has been deposited. The area of the deposit is extensive, involving sections of the tree as much as several feet above and below the wound, the total quantity of extractives deposited being very large.

This is in direct contrast to the method of treating a tree in the ordinary turpentining operation. In the latter operation, a shallow open wound is made in the tree which extends only a slight distance into the sapwood. This causes the exudation of a relatively small amount of extractive (oleoresin) which runs down the side of the tree and is collected.

As pointed out above, the exudation is not continuing, but stops after a few days. It then is necessary to wound the tree again to renew the process. This results in the formation of a scarred area which extends after a period of time several feet along the trunk of the tree. It is to be noted particularly that by the ordinary turpentining operation there is no change whatsoever occurring within the woody portion of the tree. The extractive content of the woody portion is not increased, but remains normal in every respect. (Kurth and Sherrard, Ind. Eng. Chem. 24, 1179 (1932); Skolnik and Snow, Paper Trade Journal 122, 126 (March 21, 1946).)

A further distinguishing feature of the present invention is that hereinabove noted of resulting in the production of extractive materials having a substantially different content than that produced in the ordinary turpentining operation. The difference fortunately is in the direction of increasing the content of the more valuable constituents of the extractive product. Thus, by the practice of the present method the resin acids (rosin) content of the extractive product may be increased from a normal value of about 25% to a value of about 60%. Similarly the content of volatile materials (turpentine) may be increased from a usual value of about 1.5% to a value of about 11%. Since these two materials are the ones of greatest value, this feature adds greatly to the value of my method.

The trees to which the method of my invention may be applied include in general those which produce extractive materials by their physiological processes, the most important being those of the genus Pinus, including the southern slash pine, the southern longleaf pine, *Pinus lambertiana*, *Pinus monticola*, and the like. In practicing my method, as is illustrated particularly in Figure 1 of the drawings, a substantially closed wound 9 is made in the tree 10, penetrating the bark 11, and extending substantially through the sapwood 12 to the heartwood 13. The wound may be made at any selected spot in the tree, but preferably is made in the stump region for reasons which will be developed more fully hereinafter.

The nature of the wound is such that the wood substance is disturbed and separated, but without leaving a substantial opening, so that the wounded area is not exposed to the atmosphere. Such a closed wound may be formed, for example by means of a wedge or other sharp instrument which will penetrate the wood without removing a large amount of the wood substance. Alternatively, the wound may be made by means of rods or other blunt instruments such as rifle bullets driven at high velocity into the wood, or by thin saws or small drills which do not leave a large opening in the wood. In all of the wounds of the foregoing types, the wood fibers although displaced temporarily by the wounding instrument tend upon the removal of the latter to spring back to positions approximating their original positions, thereby closing off the wound.

The wound may be continuous for a substantial distance or discontinuous, but in any event should penetrate the sapwood a substantial distance, preferably to the heartwood. In this way a large number of the resin ducts are intercepted and a correspondingly large amount of the resin is deposited in the wounded area. A suitable wound comprises a continuous incision made by means of a wedge for a distance equal to about one-quarter of the circumference of the tree and extending through the sapwood to the heartwood. If desired, a second such wound 14 may be made on the opposite side of the tree, thus wounding in all about one-half of the total circumference of the tree.

After the wound has been made in the tree, the deposition of extractive materials commences at once. These materials are deposited in the region of the wound and above and below thereof for an area which may after a period of time extend for several feet on either side of the wound. The rate at which the extractives accumulate obviously is determined by many factors including the tree species, the extent and nature of the wounding, the climatic conditions, etc. However, in the usual case a sufficient amount of extractives will have accumulated after a period from three to eighteen months to warrant their commercial recovery.

The effect of wounding the tree in the manner indicated above is to impregnate the wood above and below the wound with extractive materials. These may be recovered from the wood by felling the tree and separating from the rest of the tree the areas having a high concentration of extractives. These areas then may be reduced to the form of small pieces and extracted with a suitable solvent, acetone or a petroleum hydrocarbon for example, in which the extractives are soluble.

I have discovered further that the rate of deposit of extractive materials about a closed wound inflicted well into the sapwood of a living tree may be accelerated by the introduction into the wounded area of an irritating chemical reagent. Such a reagent may be selected from the broad classes of acids, bases and salts. Typical of the acids which may be employed are sulfuric acid, hydrochloric acid, and phosphoric acid. Typical of the bases which may be used are sodium hydroxide and potassium hydroxide. Representative salts which may be used include particularly the acidic salts such as alum, and the basic salts such as sodium carbonate. Preferred chemical reagents for the purpose indicated are an aqueous solution of sulfuric acid having a concentration of about 40% by weight sulfuric acid, and a dilute aqueous solution of caustic soda.

In using the foregoing and other chemical reagents for stimulating the production of extractives by a tree (Figure 4), the tree 15 first is wounded by inflicting a substantially closed wound 16 through the bark 17 well into the sapwood 18, to or near the heartwood 19. The wound preferably slopes slightly downwardly toward the center of the tree. Holes 20 are drilled into the tree at points above the wound, the holes communicating with the wound in the sapwood area. The selected chemical reagent then may be introduced into these holes whereupon it flows downwardly into the wound, flooding the surface of the latter. Because of the inward inclination of the wound, the chemical reagent is retained therein and exerts its stimulating effect for a substantial period of time.

The presently described method for producing extractive materials has several important commercial applications. In the first place, it may be applied to increasing by a substantial amount the yield of extractives which may be recovered from the stumps remaining after commercial logging operations. In this application, the wounds are inflicted about the stump portion of the tree from six months to two years before felling of the tree. During this period, the extractives build up in substantial quantities in the stump. The tree then may be felled and the trunk portion converted into lumber or pulp as desired. The stump may be processed immediately for recovery of the extractives, since substantial quantities of the latter have been deposited in the sapwood. This is in direct contrast to the present procedure practiced because of the deficiency of the normal sapwood in extractive materials, and comprising permitting the stump to stand in the ground for a period of from eight to ten years during which time the extractives-deficient sapwood rots away leaving the extractive-rich heartwood. Hence not only is the long waiting period avoided, but the total quantity of extractives obtainable from a given stump is very largely increased because the sapwood also may be processed for their recovery.

Still another application comprises that in which cull trees valueless as sources of lumber or pulp wood may be employed as generators of extractive materials. In this application the closed wounds are inflicted at suitable intervals up and down the trunk of the tree as well as in the stump region. After a suitable waiting period, the tree may be felled and the entire tree, including both the trunk and stump, processed for the recovery of its extractive content.

Still a further application, which is closely related to that set forth immediately above, comprises utilizing as sources of extractive materials immature trees composed almost entirely of sapwood and normally having a relatively small content of extractive materials. Here again the tree may be wounded by means of closed wounds placed at intervals in both the stump and trunk of the tree. Alternatively, if the trunk is to be devoted to another purpose, the stump only may be wounded in this manner. After a period of time sufficient for the accumulation of a substantial quantity of extractives has passed, the tree may be felled and the wounded areas on the trunk or stump, or both, may be treated for recovery of the developed and accumulated extractives.

The method of the present invention and the effect of its practice on the production of extractive materials by living trees and on the constituents of such extractives are illustrated by the following examples.

EXAMPLE 1

Two ponderosa pine trees, A and B, the sapwood of which contained 2.9% and 1.8% by weight of extractive materials respectively were wounded by driving a falling wedge into the tree about six inches into the sapwood. The wounding was continued until there was an eighteen to twenty inch continuous incision across the face of the trunk about 15 inches above the ground level. The trees then were permitted to stand without further attention for a period of one year. At six month intervals borings were taken and analyzed at various levels above and below the wound. The amounts of extractives present as indicated by the analyses of the borings are given in Table I, the amounts being expressed in per cent by weight.

Table I

| Sample taken from— | Tree A | | | | Tree B | | | |
|---|---|---|---|---|---|---|---|---|
| | Time elapsed after wounding (days) | | | Percent Increase | Time elapsed after wounding (days) | | | Percent Increase |
| | 0 | 180 | 360 | | 0 | 180 | 360 | |
| 6" above wound | 2.9 | ------ | 18.0 | 520 | 1.8 | ------ | 17.4 | 865 |
| 3" above | 2.9 | 20.6 | 21.4 | 640 | 1.8 | 14.3 | 21.4 | 1,090 |
| 1" above | 2.9 | 22.5 | 27.6 | 880 | 1.8 | 24.8 | 33.3 | 1,750 |
| 1" below | 2.9 | 39.8 | 47.1 | 1,520 | 1.8 | 32.0 | 43.0 | 2,300 |
| 3" below | 2.9 | 30.7 | 29.7 | 920 | 1.8 | 21.3 | 29.7 | 1,550 |
| 6" below | 2.9 | ------ | 19.4 | 570 | 1.8 | ------ | 23.5 | 1,200 |

The extractive material obtained from the trees then was analyzed to determine its composition, and the results compared with those obtained by an analysis of the normal sapwood of the unstimulated area of the tree. The comparison is set forth in Table II:

Table II

| | Resin Acids (Rosin) | Volatiles (Turpentine) | Water-Ether Insoluble | Water Soluble | Fatty Acids | Esters | Unsaponifiable |
|---|---|---|---|---|---|---|---|
| Normal | 24.8 | 1.6 | 1.9 | 9.9 | 40.9 | 12.6 | 8.2 |
| Stimulated | 57.9 | 10.9 | 0.0 | 0.4 | 7.1 | 11.2 | 12.1 |

EXAMPLE 2

This example illustrates the effect of stimulating the extractive production about a closed wound by the addition of chemical reagents.

Two ponderosa pine trees, C and D, the sapwood of which contained 1.5 and 1.9% by weight extractives respectively, were wounded as set forth in Example 1. Increment holes were placed periodically above the length of the wound, and an aqueous 40% solution of sulfuric acid was applied throughout the area of the closed wound by pouring the acid down the holes. The trees then were permitted to stand unattended for one year, samples of the wood about the wound being taken and analyzed at the end of six month and twelve month periods. The results are given in Table III:

Table III

| Sample taken from— | Tree C | | | | Tree D | | | |
|---|---|---|---|---|---|---|---|---|
| | Time elapsed after wounding (days) | | | Percent Increase | Time elapsed after wounding (days) | | | Percent Increase |
| | 0 | 180 | 360 | | 0 | 180 | 360 | |
| 9" above wound | 1.5 | ------ | 27.7 | 1,740 | 1.9 | ------ | 21.0 | 1,000 |
| 6" above | 1.5 | 12.0 | 32.2 | 2,020 | 1.9 | 15.3 | 27.2 | 1,340 |
| 1" below | 1.5 | 40.2 | 46.2 | 2,980 | 1.9 | 38.3 | 41.3 | 2,070 |
| 6" below | 1.5 | 25.0 | 30.4 | 1,920 | 1.9 | 23.0 | 25.3 | 1,230 |
| 9" below | 1.5 | ------ | 18.8 | 1,150 | 1.9 | ------ | 19.2 | 910 |

The extractive material obtained was analyzed and its content compared with that of a sample of the normal, unstimuated sapwood of the tree. These results are given in Table IV:

Table IV

| | Resin Acids (Rosin) | Volatiles (Turpentine) | Water-Ether Insoluble | Water Soluble | Fatty Acids | Esters | Unsaponifiable |
|---|---|---|---|---|---|---|---|
| Normal | 22.7 | 1.9 | 1.7 | 9.3 | 38.1 | 16.3 | 10.0 |
| Stimulated | 52.7 | 15.7 | 0.3 | 2.3 | 05.0 | 13.5 | 10.4 |

EXAMPLE 3

A 26 inch diameter ponderosa pine tree was wounded 10 inches from its base. Increment borings revealed that it contained approximately 50% by weight of heartwood and 50% by weight of sapwood, containing 20% and 3% extractives, respectively. A ton of this stumpwood, if processed, would yield about 230 pounds of extractives. The tree was wounded by driving a falling wedge into it, about 5 inches into the sapwood. The wedge wounding was continued, until there was a 20 inch continuous incision across the face of the trunk. A similar wound was placed on the opposite side, thus incising about ½ the circumference of the tree. One year later the tree was felled. The stimulated sapwood area of the stump averaged 30% extractives as compared to its former extractive content of 3%.

A ton of this stumpwood, including the unstimulated heartwood area, yielded about 365 pounds extractives, as compared to the 230 pounds which would have been obtained if the stump had remained unwounded.

EXAMPLE 4

A tree similar to that in Example 1, was wounded as above. However, after the wound was placed in the tree, inclined increment borings were placed every six inches above the wound. The bottoms of the increment borings reached the severed surface of the closed wound about 3 inches into the sapwood. Forty per cent sulfuric acid was poured into each of these holes. Ten months later, the tree was felled and this stumpwood yielded approximately 460 pounds of extractives per ton, or twice as much as was present in the stump prior to wounding.

EXAMPLE 5

A ten inch diameter immature ponderosa pine tree consisting largely of sapwood containing 4.5% extractive was wounded near its base. Slightly inclined increment borings, 1/16 inch in diameter and about 3 inches deep, were placed in the sapwood, until 40% of the total circumference of the tree was wounded. Forty per cent sulfuric acid was poured directly into the slightly inclining increment boring holes. Shortly thereafter, most of the holes became closed with extractives. The tree was felled 16 months later and the stump area averaged 20.4% extractives, or about 5 times the amount originally present.

EXAMPLE 6

Several pointed steel rods were inserted well into the sapwood of a ponderosa pine tree, and then removed. Eighteen months later the tree was felled and the wood about the wounded area was segregated from the unstimulated area. The stimulated pitchy area contained 34.2% extractives, while the unaffected or normal wood area contained 5.5% of these materials. Thus the stimulated wood yielded over 6 times the amount of extractives found in the normal wood.

The approximate composition of the extractives obtained from the stimulated and unstimulated areas of the tree are given in Table V:

Table V

|  | Resin Acids (Rosin) | Volatiles (Turpentine) | Water-Ether Insoluble | Water Soluble | Fatty Acids | Esters | Unsaponifiable |
|---|---|---|---|---|---|---|---|
| Normal | 28.4 | 1.2 | 1.5 | 7.6 | 42.4 | 11.1 | 7.6 |
| Stimulated | 62.2 | 17.0 | 0.9 | 0.5 | 4.2 | 4.5 | 10.6 |

EXAMPLE 7

Wounds were inflicted into the sapwood of a tree about 32 feet above ground level by shooting high caliber rifle shot into the tree. When the tree was felled about 2 years later, massed pitch was found deposited above and below the wounded areas in long streaks gradually tapering to a point a foot or more beyond the immediate vicinity of the bullet wounds. The wounded massed pitch area contained 41.5% extractives while the normal wood adjacent to the massed pitch area yielded 2.1% extractives.

The approximate composition of the extractives from the stimulated and unstimulated areas ran as follows:

Table VI

|  | Resin Acids (Rosin) | Volatiles (Turpentine) | Water-Ether Insoluble | Water Soluble | Fatty Acids | Esters | Unsaponifiable |
|---|---|---|---|---|---|---|---|
| Normal | 24.8 | 1.6 | 1.9 | 9.9 | 40.9 | 12.6 | 12.1 |
| Stimulated | 57.9 | 10.9 | 0.0 | 0.4 | 7.1 | 11.2 | 8.2 |

EXAMPLE 8

The stump area of a ponderosa pine tree was wounded by means of a blade attached to a logging tractor. Nine months later the deeply bruised sapwood of the stump contained 32.6% extractives while the unaffected area contained only 8.7% extractives.

Hence it will be apparent that I have provided a method for obtaining extractive materials from trees which has many advantages and distinguishing features over the methods previously practiced. In the first place, there are obtained from the practice of my method very greatly increased yields of extractive materials, the extractive content of the sapwood being increased by as much as 30 times that present in the unstimulated sapwood. In the second place, the extractive materials obtained by my method have a substantially increased content of turpentine and rosin, the constituents of primary interest, the amount of the former being increased about sixfold, and the amount of the latter being about doubled. Thirdly, my method results in the continuing production of extractive materials by a living tree over a long period of time without any attention whatsoever beyond the preliminary treatment of the tree. Finally, my method may be applied to advantage in a number of commercial situations including the production of extractive materials from stumps while eliminating the eight to ten year waiting period which heretofore has been necessary before the stumps have been harvested; the recovery of extractives from cull trees having no other commercial value; and the production of extractives from immature trees composed principally of sapwood which normally has an insufficient content of extractive materials to warrant their processing for extractive recovery.

Having now described my invention in preferred embodiments, I claim:

1. The method of producing extractive materials from living trees which comprises inflicting across the grain direction of the wood a substantially closed wound wherein the wood is severed and the severed wood surfaces are in substantial contact with each other, the wound penetrating a substantial distance in the sapwood of the tree, thereby causing the continuing deposition of extractive materials in the region of the wound, permitting the accumulation of the extractive materials, and then recovering the accumulated extractive materials from the wood structure in which they have been deposited.

2. The method of producing extractive materials from selected areas of living trees which comprises inflicting across the grain direction of the wood a substantially closed wound wherein the wood is severed and the severed wood surfaces are in substantial contact with each other.

the wound penetrating a substantial distance in the sapwood of the tree, thereby causing the continuing deposition of extractive materials in the wood about the wound, permitting the accumulation of the extractive materials over a substantial period of time, comminuting the portions of the tree containing the accumulated extractive materials, and solvent extracting the comminuted product for the recovery of its extractive content.

3. The method of recovering values from living immature trees composed substantially of sapwood normally having a low content of extractive materials, which comprises inflicting across the grain direction of the wood a substantially closed wound wherein the wood is severed and the severed wood surfaces are in substantial contact with each other, the wound penetrating a substantial distance into the sapwood in the stump portion of the tree, thereby causing the continuing deposition of extractive materials in the wood about the wound, permitting the accumulation of the extractive materials in the stump over a predetermined period of time, felling the tree and utilizing the trunk portion for its wood content, and recovering the accumulated extractive materials from the stump.

4. The method of recovering values from living immature trees composed substantially of sapwood normally having a low content of extractive materials, which comprises inflicting across the grain direction of the wood a substantially closed wound wherein the wood is severed and the severed wood surfaces are in substantial contact with each other, the wound penetrating a substantial distance into the sapwood in the stump of the tree, thereby causing the continuing deposition of extractive materials in the wood about the wound, permitting the accumulation of the extractive materials in the stump over a predetermined period of time, felling the tree and utilizing the trunk portion for its wood content, reducing the stump to pieces, and solvent extracting the pieces for recovery of their extractive content.

5. The method of utilizing cull trees valueless as lumber which comprises inflicting across the grain direction of the wood a plurality of substantially closed wounds wherein the wood substance is severed and the severed wood surfaces are in substantial contact with each other, the wounds penetrating a substantial distance into the sapwood along the trunk of the living tree, thereby inducing the continuing deposition of extractive materials in the wood about the wounds, permitting the accumulation of extractive materials in the trunk over a predetermined period of time, felling the tree, and recovering from the trunk its accumulated content of extractive materials.

6. The method of utilizing cull trees valueless as lumber which comprises inflicting across the grain direction of the wood a plurality of substantially closed wounds wherein the wood substance is severed and the severed wood surfaces are in substantial contact with each other, the wounds penetrating a substantial distance into the sapwood along the trunk of the living tree, thereby inducing the continuing deposition of extractive materials in the wood about the wounds, permitting the accumulation of extractive materials in the trunk over a predetermined period of time, felling the tree, reducing the trunk to small pieces, and solvent extracting the pieces for recovery of their content of extractive materials.

7. The method of recovering increased amounts of extractive materials from the stump of a tree which comprises inflicting a substantially closed wound in the sapwood of the stump portion of the live tree a predetermined time prior to its felling, the wound penetrating the sapwood to the heartwood region, thereby causing the continuing deposition of extractive materials in the normally extractive-deficient sapwood, felling the tree after substantial amounts of extractive materials have accumulated in the stump sapwood, and recovering the extractive materials contained in the stump.

8. The method of recovering increased amounts of extractive materials from the stump of a tree which comprises inflicting a substantially closed wound in the sapwood of the stump portion of the live tree a predetermined time prior to its felling, the wound penetrating the sapwood to the heartwood region, thereby causing the continuing deposition of extractive materials in the normally extractive-deficient sapwood, felling the tree after substantial amounts of extractive materials have accumulated in the stump sapwood, comminuting the stump, and solvent extracting the comminuted stump for the recovery of its extractive content.

9. The method of stimulating the production of extractive materials by a living tree and of causing the continuing deposition of said materials in selected areas of the tree which comprises inflicting across the grain direction of the wood a substantially closed wound wherein the wood is severed and the severed wood surfaces are in substantial contact with each other, the wound penetrating a substantial distance into the sapwood of the tree, introducing into the wound an extractive-stimulating chemical reagent, permitting the accumulation of the extractive materials throughout the wood in the region of the wound for a predetermined time, and then recovering the accumulated extractive materials from the areas in which they have been deposited.

10. The method of claim 9 in which the extractive-stimulating chemical reagent is an inorganic acid.

11. The method of claim 9 in which the extractive-stimulating chemical reagent is sulfuric acid.

12. The method of claim 9 in which the extractive-stimulating chemical reagent is an inorganic base.

13. The method of claim 9 in which the extractive-stimulating chemical reagent is caustic soda.

ARTHUR B. ANDERSON.

REFERENCES CITED

The following references are of record in the file of this patent:

UNITED STATES PATENTS

| Number | Name | Date |
|---|---|---|
| 952,245 | Gardner | Mar. 15, 1910 |
| 1,313,709 | McKoy | Aug. 19, 1919 |
| 2,053,031 | Hessenland | Sept. 1, 1936 |

(Other references on following page)

FOREIGN PATENTS

| Number | Country | Date |
|--------|---------|------|
| 693,723 | France | Sept. 2, 1930 |
| 449,468 | Great Britain | June 19, 1936 |
| 14,002 | Netherlands | Dec. 15, 1925 |

OTHER REFERENCES

Ind. Eng. Chem., vol. 24, No. 10, pp. 1179–1181, October 1932.

Sci. Am., vol. 169, No. 5, pp. 202–204, November 1943.

Leaflet 83, "More Turpentine . . ." U. S. Dept. Agr., 1931, 5 pp.

Occasional Paper 106, "The Use of Chemical Stimulants . . ." U. S. Dept. Agr., Forest Service, Southern Forest Expt. Sta., page 1, September 1, 1944.